United States Patent Office 2,995,353
Patented Aug. 8, 1961

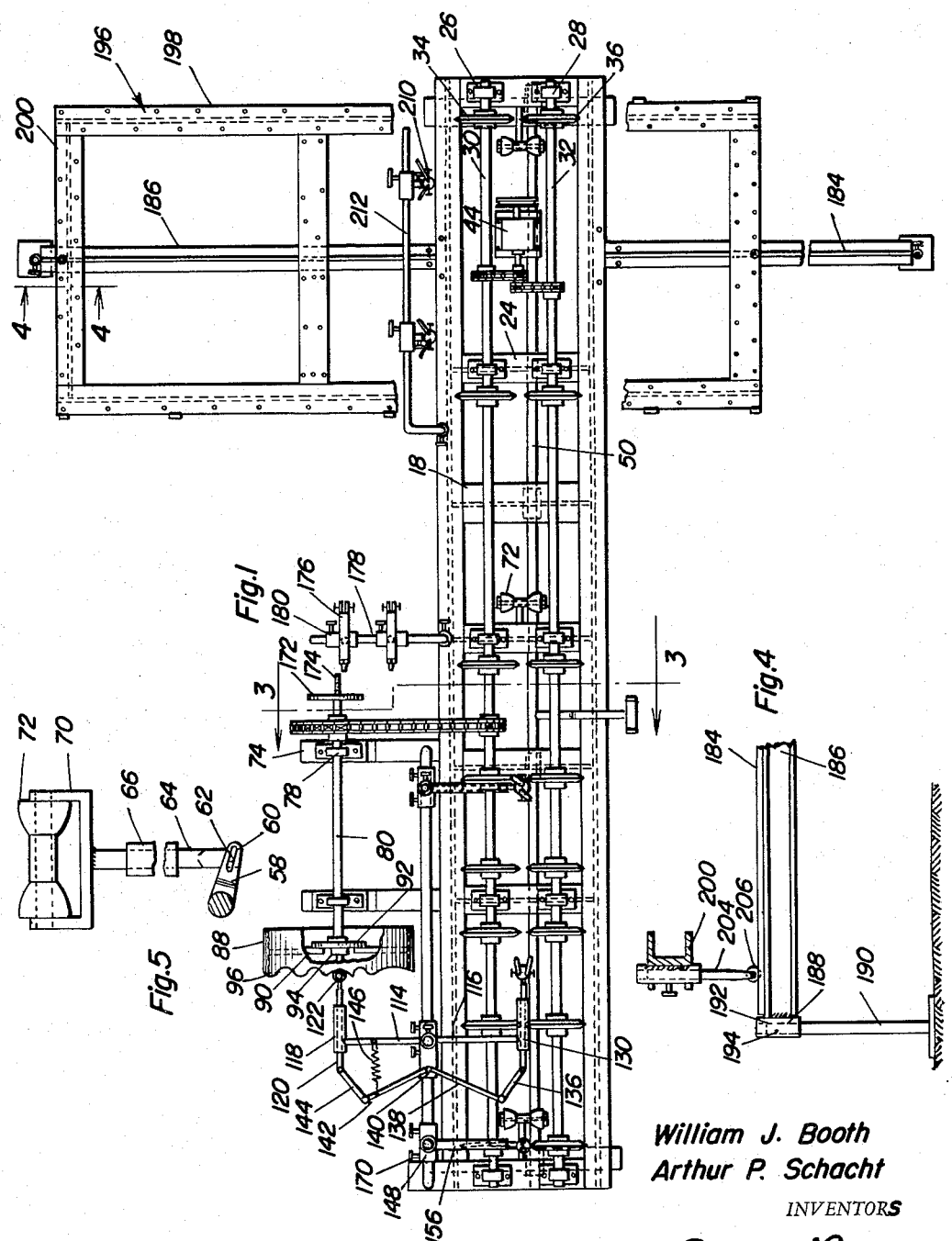

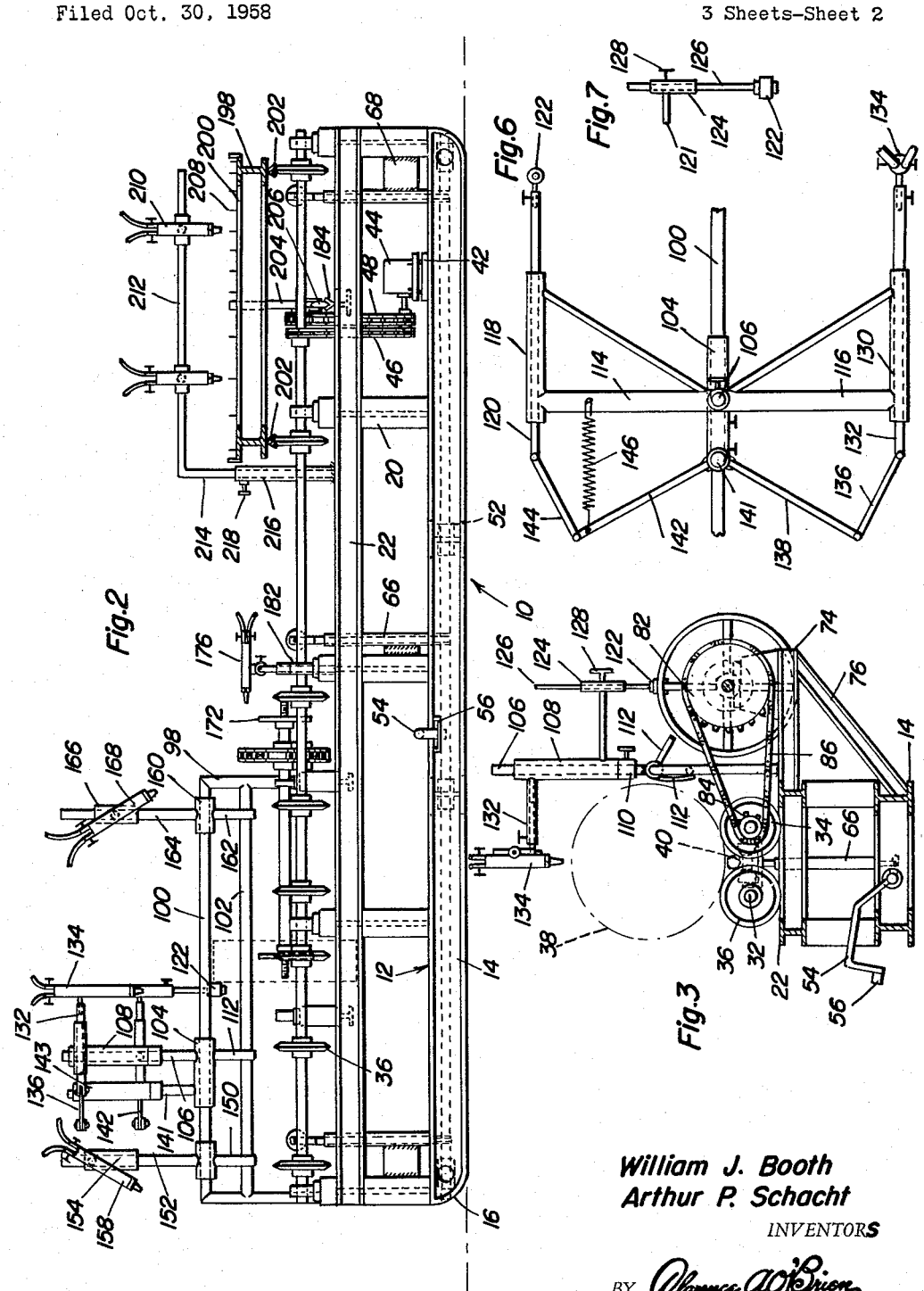

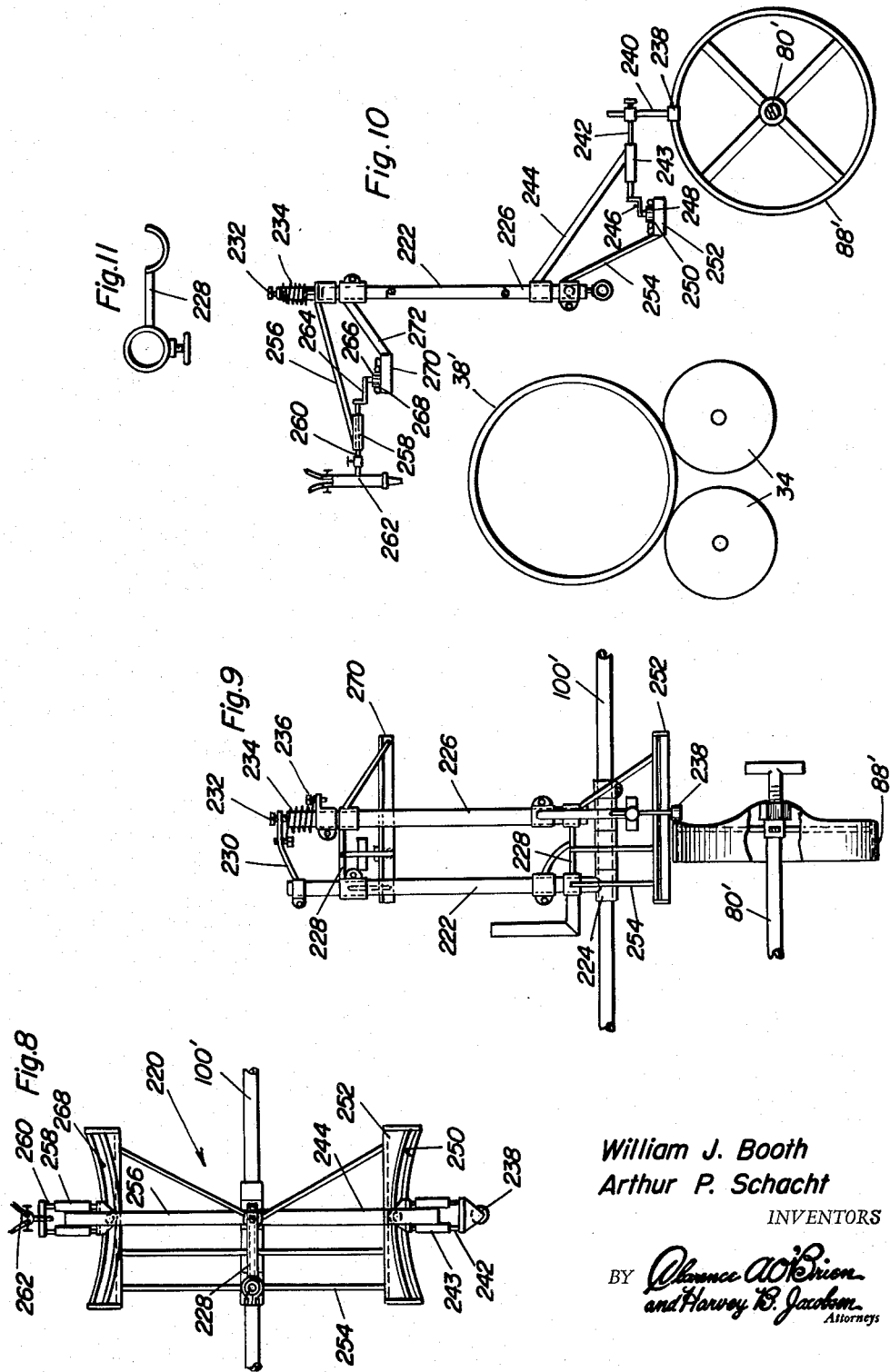

2,995,353
PIPE CUTTING MACHINE
William J. Booth, 31 3rd Ave. N., Texas City, Tex., and Arthur P. Schacht, P.O. Box 688, Alvin, Tex.
Filed Oct. 30, 1958, Ser. No. 770,679
3 Claims. (Cl. 266—23)

The present invention generally relates to a pipe cutting machine and more particularly to that type of pipe cutting machine which employs a flame torch for use in cutting the pipe.

An object of the present invention is to provide a pipe cutting machine employing a torch which will flame cut and bevel any pipe cuts including saddles, laterals, blunt field heads and Y branches in any desired degree on one and one-half inch pipe through thirty-six inch pipe diameters and which may also be used in straight line cutting on any size plate and for cutting circles from the plate.

Another object of the present invention is to provide a pipe cutting machine which is simple in operation and eliminates the use of complex mechanical movements and gripping devices, easy to operate, capable of operation in various manners for various purposes, fast and efficient in operation for use with various types of power, portable, durable in construction, long lasting and relatively inexpensive to manufacture and maintain.

A further important object of the present invention is to provide a pipe cutting machine generally incorporating in its construction a supporting base with a series of pairs of rotatable disks thereon for supporting a pipe to be cut together with a movable torch mounted for movement in accordance with a template for cutting the pipe as the pipe is rotated by the driven disk.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a plan view of the machine of the present invention with ports thereof broken away for clarity;

FIGURE 2 is a side elevation of the construction of FIGURE 1;

FIGURE 3 is a transverse, vertical sectional view taken substantially upon a plane passing along section line 3—3 of FIGURE 1;

FIGURE 4 is a detailed sectional view taken substantially upon a plane passing along section line 4—4 of FIGURE 1 illustrating the construction of the straight line plate cutting mechanism;

FIGURE 5 is a detailed sectional view illustrating the pipe conveying mechanism which may be raised or lowered due to the eccentric forming a part of the mechanism;

FIGURE 6 is a plan view of the slide and mechanical arm for carrying the torch and including the template follower;

FIGURE 7 is an enlarged view of the template follower;

FIGURE 8 is a plan view of a modified form of mechanical arm movably supporting the torch;

FIGURE 9 is a side elevation of the construction of FIGURE 8;

FIGURE 10 is an end view of the construction of FIGURE 9; and

FIGURE 11 is a plan view of an element employed in the construction of FIGURES 8-10.

Referring now specifically to the drawings, the numeral 10 generally designates the pipe cutting machine of the present invention which includes the supporting base generally designated by the numeral 12 and including a pair of longitudinally elongated and parallel eye beams 14 having rounded ends 16 and being disposed in rigid relation by cross-members 18 disposed at longitudinally spaced points along the longitudinal rails 14. Extending upwardly from the longitudinal rails 14 is a plurality of upright supporting members 20 which support a pair of upper longitudinal frame rails 22 of eye beam construction which may be identical to the rails 14. The upper rails 22 are interconnected by transverse members 24 disposed in longitudinally spaced relation thereby providing a rigid skeleton supporting base 12 in the form of an open framework.

Mounted on each of the upper transverse frame members 14 is a pair of bearing blocks 26 and 28. The bearing blocks 26 are disposed in longitudinal alignment and journal shaft 30 therein. The bearing blocks 28 are in longitudinal alignment and journal shaft 32 therein. The shafts 30 and 32 are parallel and extend throughout the length of the upper rails 22. Mounted on the shaft 30 is a plurality of longitudinally spaced circular disks 34 having a double bevel on the peripheral edge thereof. Mounted on the shaft 32 is a plurality of disks 36 similar to the disks 34. The disks 34 and 36 are arranged in transversely aligned pairs with the area between and above the disks 34 and 36 forming a support throat or crotch for supporting an enlarged pipe 38 or a small pipe 40 as illustrated in FIGURE 3. The pipes 38 or 40 are supported with equal facility on the disks 34 and 36 and will be rotated by the disks when the shafts 30 and 32 are rotated.

Mounted on a supporting bracket 42 on the lower frame rails is a driving motor 44 having a double drive sprocket gear on the output shaft thereof for receiving a pair of sprocket chains 46 and 48 respectively. The sprocket chain 46 encircles a sprocket gear on the shaft 32 and the chain 48 encircles a gear on the shaft 30 thus rotating the shafts 30 and 32 in the same direction and at the same speed for rotating the pipe supported by the disk at a predetermined speed. A reduction gear mechanism will be provided on the motor 44 whereby the pipe will be rotated rather slowly.

Extending longitudinally between the lower rails 14 is an elongated rod 50 which is journaled in sleeves 52. Rigidly attached to the rod 50 adjacent the center thereof is an elongated angulated arm 54 having a foot pedal 56 on the outer end thereof. Rigid with the shaft 50 is an offset eccentric arm 58 having a slot 60 therein for receiving a pin 62 rigid with the lower end of a vertically elongated support rod 64 which is slidably supported by sleeve members 66 supported from the uprights 20 by suitable brackets 68. Welded to the upper end of the elevator rod 64 is a U-shaped bracket 70 having rollers 72 journaled thereon with the outermost roller 72 being inwardly tapered and the central roller being cylindrical for providing a conveyor for the pipes 38 and 40 so that the pipes may move longitudinally on the supporting base 12 when the foot pedal 56 is depressed thus orientating the end of the pipe in the desired position after which the elevator mechanism may be lowered so that the disks 34 and 36 may cause rotation of the pipes and will actually support the pipes. As shown in FIGURE 1, the rollers 72 are so arranged that the center thereof is generally coincidental with the center of the throat or crotch formed by the disks 34 and 36.

Extending laterally from the upper rails 22 is a pair of eye beam brackets 74 braced by inclined braces 76 with the brackets 74 having bearing blocks 78 for supporting a short countershaft 80 disposed in parallel relation to the shafts 30 and 32. Attached to one end of the shaft 80 is an enlarged sprocket gear 82 in alignment with a sprocket gear 84 on the shaft 30 with the sprocket chain 86 encircling the sprocket gears 84 and 82 for driving the countershaft 80 from the shaft 30. As illustrated in FIGURE 3, the gear 82 is considerably larger than the drive sprocket gear 84 thus providing a gear reduction for rotating the shaft 80 at a relatively low speed.

Mounted on the end of the countershaft 80 remote from the sprocket gear 82 is an enlarged cylindrical template which may be in the form of an enlarged pipe nipple designated by the numeral 88 that is provided with a plurality of inwardly extending spokes 90 secured to a plate 92 mounted rigidly on the countershaft 80 but detachably thereon by a fastening nut 94. The outer end edge of the cylindrical template 88 is provided with a curved surface 96 which may be in the form of sine wave or any other desired contour for forming a template for guiding the path of cut being made on the pipes.

Rigidly supported from one of the brackets 74 and an extension on the end transverse top member 24 is a pair of upstanding tubular members 98 interconnected by a pair of horizontal guide members 100 and 102 which are disposed in spaced parallel relation to the shafts 30 and 32 as well as the countershaft 80 with the spacing between the countershaft 80 and the longitudinal members 100 and 102 being substantially equal to the space between the center of the throat between the disks 34 and 36 and the members 102 and 104. Slidably mounted on the upper guide member 100 is a sleeve 104 having an upstanding rod or tubular member 106 rigid therewith. A tubular sleeve 108 is slidably mounted on the upstanding rod 106 and an adjustable collar 110 is provided underneath the sleeve 108 for vertically adjusting the sleeve 108 on the rod 106. Depending from the sleeve 104 which is horizontally disposed is a pair of angularly disposed stop members 112 for engagement with the lower guide member 102 for orientating the member 106 in a vertical position as illustrated in FIGURE 3 but permitting movement of the sleeve 104 about the center formed by the guide bar 100.

Extending laterally from the tubular sleeve 108 is a horizontal rod 114 on one side thereof and a horizontal rod 116 on the other side thereof. The horizontal rod 114 terminates in a tubular sleeve 118 slidably receiving a rod 120 having a follower 122 thereon with the follower 122 engaging the preformed stretched out contour edge 96 of the cylindrical template 88 which is reversible on shaft 80 and has contours on each end edge. The sleeve 118 actually supports the rod 120 for sliding movement and a vertical sleeve 124 is rigid and detachably connected to the free end of the rod 120 by pin 121 for slidably receiving a support rod 126 which actually carries the roller follower 122 on the lower end thereof with a setscrew 128 being provided for adjusting the position of the roller follower 122 in relation to the template surface 96.

The horizontal rod 116 supports a horizontal sleeve 130 having a rod 132 slidable therein with the rod 132 carrying a torch 134 in a vertical position. The other end of the rod 132 is connected to a link 136 which in turn is connected to a second link 138 rigidly connected by pivot sleeve 140 to another second link 142 which is pivotally connected to a link 144 having the end thereof connected to the rod 120. The sleeve 140 is supported on rod 141 and adjustable by collar 143. A tension spring 146 extends between the link 142 and the transverse rod 114 for urging the cam follower 122 into engagement with the template surface 96 at all times. Thus, as the follower 142 moves the rod 120 inwardly and outwardly, corresponding opposite movement of the rod or shaft 132 and the sleeve 130 will occur thus moving the torch 134 in accordance with the movement caused by the template 96.

For cutting straight cuts on a piece of pipe, there is provided a sleeve 148 slidably and rotatably mounted on the guide member 100 and also including depending lugs 150 and an upstanding member 152 having a sleeve 154 carried thereby. The sleeve 154 has a laterally extending support rod 156 secured thereto for supporting a torch 158 which is adjustable to provide a straight vertical cut or any degree bevel cut which is also true of the torch 134. A similar construction is provided inwardly on the side member 100 whereby this construction includes a sleeve 160, depending lugs 162, an upright 164, a sleeve 66 slidable thereon and a rod for supporting the torch 168. Thus, the torches 168 and 158 may be provided for cutting off predetermined lengths of pipe with any degree of bevel desired with the clamp screws 170 providing relative longitudinal adjustment between the torches 158 and 168.

Mounted on the end of the countershaft 80 adjacent the ear 82 is provided a flange 172 and a threaded stud 174 to which circular plates may be attached by tack welding a nut on the circular plate for engagement with the threaded portion 174 whereby the circular plate will be mounted against the flange 172 in a true and positive manner so that the plate may be cut by a torch 176 slidably and adjustably mounted on a transversely extending support member 178 with the torch 176 having a sleeve 180 slidable thereon. The support member 178 is provided with a depending portion received in a supporting sleeve 182 rigid with the upper longitudinal rail 22.

Extending transversely of the upper longtudinal rails 22 adjacent the end thereof remote from the mechanical arm and previously mentioned torches is a transverse V-shaped guide rail 184 supported on an elongated member 186 which has each outer end thereof provided with a vertical sleeve 188 slidably receiving a supporting leg 190. The sleeve 188 is provided with a spiral slot 192 therein for receiving a fastening member 194 on the leg 190 whereby rotation of the leg 190 will cause adjustment in the effective height thereof whereby the transverse rail 186 will be rigidly supported.

A generally rectangular frame construction of eye beam members generally designated by the numeral 196 and including longitudinal members 198 and transverse members 200 is supported in transverse overlying relation to the upper rails 22. The lower surface of each longitudinal eye beam 198 is provided with an inverted V-shaped track 202 for engagement with two pair of disks 34 and 36. Supported by each transverse rail 100 is a depending leg or rod 204 having a roller 206 thereon for engagement with the trackway 184. Thus, the rollers 206 support the ends of the frame 196 and the pairs of disks 34 and 36 support the longitudinal rails 198. The upper surface of the eye beams 198 and 200 are provided with a plurality of upstanding pins 208 for supporting a flat plate whereby a pair of torches 210 supported on a horizontal transverse rod 212 may be used for cutting the plate in any desired manner. The supporting rod 112 has a depending end 214 telescopically and adjustably received in a sleeve 216 and held in adjusted position by a thumb screw 218. The sleeve 216 is rigidly supported from one of the longitudinal upper rails 22. Thus with the construction just described flat plates may be cut at any desired manner in a straight line by placing the plate on the carriage defined by the frame 196 and moving the same transversely of the longitudinal frame rails 22 while one of or both of the torches are operating. Circular plates may be cut by employing the torches 176 and the mounting flange 172. Straight line cuts may be made on pipes by the torch 158 or the torch 168 or both and the torch 134 is employed to cut a line on the pipe on the plate in accordance with a template.

Referring now specifically to FIGURES 8–11, the numeral 220 generally illustrates another form of torch supporting arm which includes a slide rail 100' and a template 88' mounted on shaft 80'. An upstanding stationary rod 222 is carried by a sleeve 224 on the guide 100' and a pivotal shaft 226 is supported in spaced parallel relation to the stationary shaft 222 by bracket members 228 which also support the upper end of the rod 226 from the rod 222. A connecting member 230 extends between the upper end of the rod 222 and rod 226 with a fastener 232 extending into the upper end of the rod 226. One end of an axial spring 234 is anchored to the member 230 and the other end thereof is anchored to a fastening member 236 rigid with the rotatable shaft 226 for causing the rotatable shaft or rod 226 to be disposed at a normal condition with a cam follower or template follower 238 in engagement with the template 88'. The orientation of the follower 238 and template 88' is shown in FIGURES 9 and 10 and the follower 238 is mounted on a vertical rod 240 adjustably supported by a pair of parallel shafts 242 which are horizontally slidable in a pair of parallel sleeves 243 which are supported from the rotatable rod 226 by an offset bracket 244. The inner ends of the shafts 242 are interconnected by an L-shaped bracket 246 which supports a roller 248 for rotation about a vertical axis. The roller 248 is disposed in an arcuate cam track 260 mounted on a horizontal support member 252 rigidly supported from the rigid rod 222 by support brackets 254 with one of the brackets 254 being connected to the bracket 228 as shown in FIGURE 10.

The upper end of rotatable rod 226 has an offset bracket 256 similar to bracket 244 and carrying a pair of sleeves 258 thereon. A pair of shafts 260 are horizontally slidable in sleeves 258 and carry a torch 262 on the outer end thereof. The inner ends of the shafts 260 are interconnected by an L-shaped bracket 264 having a roller 266 mounted thereon for rotation about a vertical axis. The roller 266 is received in a cam track 268 mounted on a stationary horizontal support member 270 rigidly supported from rod 222 by brackets 272 substantially in the same manner as the support member 252 is supported. Thus, there is generally a duplicate structure at the upper and lower extremity of the device.

Movement of the follower 238 generally parallel to the longitudinal axis of the template 88' will cause oscillation of shaft 226 and corresponding movement of the torch 252 but in an opposite direction. As the follower 238 and torch 262 move, they would normally move in an arcuate manner about the vertical axis of shaft 226. This arcuate movement is compensated for by the arcuate cam tracks 250 and 268 which move the shafts 242 and 260 respectively inwardly and outwardly so that the path of movement of the follower 238 and torch 262 is in a straight line parallel to the axis of rotation of the template thereby eliminating inaccuracies that would be caused by arcuate movement of the follower and torch.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A pipe cutting machine comprising a supporting frame, a pair of elongated parallel shafts mounted on said frame, means for driving said shafts in the same direction, each of said shafts having a plurality of longitudinally spaced disks thereon with the disks on the shafts being in transverse aligned pairs for providing a longitudinal crotch for supporting a pipe whereby rotation of the shafts and disks will cause rotation of the pipe about its longitudinal axis, and means adjustably supporting a torch for cutting the pipe during rotation thereof, said torch supporting means including an arm mechanism, means pivotally supporting the arm mechanism adjacent the center for swinging movement about a generally vertical axis, a follower mounted on one end of said arm mechanism, a template mounted on said frame and engaging the follower for moving the follower, the other end of said arm mechanism supporting the torch, said arm mechanism including means for compensating for movement of the arm mechanism about a centrally disposed vertical axis and causing movement of the torch in a straight line path paralleling the longitudinal axis of the pipe being cut, said compensating means including an arcuate cam track stationarily supported at each end of the arm mechanism, means slidably supporting the template follower on the arm mechanism for movement transversely of the rotational axis of the template, said template follower including support rods slidably received in the supporting means, a roller on the inner ends of the rods with the roller received in the cam track whereby arcuate swinging movement of the arm mechanism caused by the template will move the supporting means in an arcuate path thereby moving the roller in relation to the cam track, said cam track having outer ends curving towards the template for moving the template follower outwardly when the arm mechanism is swung in either direction from a centralized position, said cam track, roller, supporting means and rods being duplicated on the other end of the arm mechanism for supporting the torch on the outer ends of the rods for supporting the torch for movement in parallel relation to the axis of rotation of the pipe being cut.

2. The structure as defined in claim 1 wherein said arm mechanism includes an upstanding shaft supported for vertical swinging movement, and spring means urging said shaft to a normal position with the arm mechanism extending generally perpendicularly to the axis of rotation of the pipe being cut and the template.

3. The structure as defined in claim 2 wherein said frame is provided with a plurality of vertically movable support members, each support member having a pair of inclined rollers on the upper end thereof disposed for movement vertically in relation to the crotch between the disks thereby raising the pipe supported in the crotch to a point above the disk for enabling the pipe to be moved longitudinally thereof.

References Cited in the file of this patent

UNITED STATES PATENTS

| | | |
|---|---|---|
| 757,151 | Streich | Apr. 12, 1904 |
| 1,542,887 | Irvin et al. | June 23, 1925 |
| 2,295,229 | McGuire | Sept. 8, 1942 |
| 2,432,703 | Walden | Dec. 16, 1947 |
| 2,494,994 | Gamallo | Jan. 17, 1950 |
| 2,500,245 | Doyle | Mar. 14, 1950 |
| 2,545,666 | Lonngren | Mar. 20, 1951 |
| 2,716,989 | Joy | Sept. 6, 1955 |
| 2,726,450 | Ware | Dec. 13, 1955 |
| 2,778,625 | Evans | Jan. 22, 1957 |
| 2,828,120 | Porter | Mar. 25, 1958 |
| 2,847,204 | Menser et al. | Aug. 12, 1958 |
| 2,859,029 | Joy | Nov. 4, 1958 |